United States Patent
Nichols

(10) Patent No.: US 10,863,322 B2
(45) Date of Patent: Dec. 8, 2020

(54) WIRELESS COMMUNICATION WITH REPLAY ATTACK PROTECTION FOR LOW POWER BUILDING CONTROL APPLICATIONS

(71) Applicant: Ademco Inc., Golden Valley, MN (US)

(72) Inventor: Steven C. Nichols, Plymouth, MN (US)

(73) Assignee: Ademco Inc., Golden Valley, MN (US)

( * ) Notice: Subject to any disclaimer, the term of this patent is extended or adjusted under 35 U.S.C. 154(b) by 33 days.

(21) Appl. No.: 16/101,723

(22) Filed: Aug. 13, 2018

(65) Prior Publication Data

US 2020/0053517 A1    Feb. 13, 2020

(51) Int. Cl.
| | |
|---|---|
| *H04W 4/12* | (2009.01) |
| *H04W 12/12* | (2009.01) |
| *H04W 4/38* | (2018.01) |
| *H04W 4/33* | (2018.01) |
| *H04W 12/02* | (2009.01) |

(52) U.S. Cl.
CPC ............... *H04W 4/12* (2013.01); *H04W 4/33* (2018.02); *H04W 4/38* (2018.02); *H04W 12/02* (2013.01); *H04W 12/12* (2013.01)

(58) Field of Classification Search
None
See application file for complete search history.

(56) References Cited

U.S. PATENT DOCUMENTS

| | | | |
|---|---|---|---|
| 5,544,036 A | 8/1996 | Brown, Jr. et al. | |
| 6,177,861 B1 | 1/2001 | MacLellan et al. | |
| 8,892,031 B2 | 11/2014 | Ben Hamida et al. | |
| 9,411,748 B2 | 8/2016 | Sarangdhar et al. | |
| 9,621,371 B2 | 4/2017 | Reeder et al. | |
| 9,866,396 B2 | 1/2018 | Buckley et al. | |
| 9,887,843 B1 | 2/2018 | Robshaw et al. | |
| 9,887,974 B2 | 2/2018 | Charan et al. | |
| 2006/0072455 A1 | 4/2006 | Cai et al. | |
| 2011/0066297 A1 | 3/2011 | Saberi et al. | |
| 2012/0110331 A1* | 5/2012 | Falk ................. | H04W 52/0229 713/168 |

(Continued)

FOREIGN PATENT DOCUMENTS

EP    1610526 A3    8/2013

OTHER PUBLICATIONS

Li et al., "A Joint Network and Channel Coding Strategy for Wireless Decode-and-Forward Relay Networks," IEEE Transactions on Communications, 59(1): 13 pages, Jan. 2011.

*Primary Examiner* — Adnan Baig
(74) *Attorney, Agent, or Firm* — Shumaker & Sieffert, P.A.

(57) ABSTRACT

A system that implements wireless communication with replay protection for lower power building control applications. In one example, a battery-powered device includes a counter value with each message transmitted to an always-on device. If the always-on device receive an invalid counter value, instead of sending back an acknowledgement, it sends back a message containing an updated counter value. The battery-powered device may keep its receiver on after sending a message for at least a period of time, the battery-powered device receives the message and updates its counter with the received updated counter value. Since it did not receive an acknowledgement, it retries its original message, this time with the updated counter value. The retry message is likely to be successfully transmitted.

20 Claims, 7 Drawing Sheets

(56) References Cited

U.S. PATENT DOCUMENTS

| | | |
|---|---|---|
| 2014/0310566 A1 | 10/2014 | Balakrishnan et al. |
| 2016/0320824 A1 | 11/2016 | Prathipati et al. |
| 2017/0078996 A1* | 3/2017 | Shoihet ............... H04W 76/36 |
| 2019/0045442 A1* | 2/2019 | Montoya ............. H04L 9/0631 |
| 2019/0121576 A1* | 4/2019 | Jean .................... G06F 3/0679 |

* cited by examiner

US 10,863,322 B2

WIRELESS COMMUNICATION WITH REPLAY ATTACK PROTECTION FOR LOW POWER BUILDING CONTROL APPLICATIONS

TECHNICAL FIELD

The disclosure relates generally to wireless communication, and more specifically to wireless communication with replay protection for lower power applications.

BACKGROUND

Wireless communications can be susceptible to replay attacks. A replay attack is a form of network attack in which a valid wireless data transmission is received by an eavesdropper, and later maliciously or fraudulently re-transmitted to the system in attempt to cause mischief. For example, in a building control system, a building controller may send an encrypted wireless data transmission to a temperature sensor that instructs the temperature sensor to wake up from a lower power sleep state, transmit a sensed temperature back to the building controller, and then return to the lower power sleep state. The temperature sensor may be battery powered and thus efficient use of its battery energy may be important to increase the time between battery replacements. An eavesdropper may receive the encrypted wireless data transmission to the temperature sensor, and may later repeatedly re-transmit the encrypted wireless data transmission. If the temperature sensor does not have some form of replay attack protection, the temperature sensor will repeatedly wake up, transmit a sensed temperature, and then return to the lower power sleep state. Such a replay attack may deplete the battery of the temperature sensor prematurely. In another example, a wireless gateway in a building may transmit an encrypted disarm command to a security system controller of a building, which may disarm the security system. In some cases, the disarm command may be a result of a disarm selection made via an application program running on an authorized user's smart phone, which is routed via the Internet to the wireless gateway for transmission to the security system controller. If the security system controller does not have some form of replay attack protection, an eavesdropper may receive the encrypted disarm command and replay the command whenever desired. This could effectively provide the eavesdropper with the ability to disarm the security system on demand.

Counters are a standard method to protect wireless message transmissions against replay attacks. Typically, a counter value is incremented and transmitted with each message from a transmitting device of a system. A receiving device of the system compares the received counter value against the counter value in the previous message received from the transmitting device, and ignores the received message if it does not have a greater value. Thus, when a message is captured by an eavesdropper, and re-transmitted, the counter valve attached to the re-transmitted message will not be greater than the previous message, and thus will be rejected by the receiving device. In some cases, the counters of the transmitting device and the receiving device may become out of sync because of noise, message collisions or the like. Recovery often includes having the receiving device send to the transmitting device an expected counter value. The transmitting device then retransmits the message with the updated counter value, which should result in a successful transmission.

This process becomes problematic in wireless systems when the transmitting device is battery powered and the receiving device is line powered. In such a system, in order to conserve battery energy, the battery powered transmitting device often remains in a lower power sleep state and only listens for messages from the receiving device at some relatively large interval of time, and the line powered receiving device only sends messages to the battery powered device at that prescribed interval. As such, in such systems, until the end of the interval is reached and the always on device can transmit a proper counter value back to the battery powered device, any messages sent by the battery powered device to the line powered device will be ignored, thus wasting battery energy at the battery powered device.

SUMMARY

The present disclosure relates generally to wireless communication, and more specifically to wireless communication with replay protection for lower power building control applications.

An illustrative method for wireless transmitting a message from a first device to a second device may begin by awaking the first device from a lower power sleep mode, wirelessly transmitting a data packet that includes a message and a token from the first device for reception by the second device, and receiving the data packet at the second device. The second device may determine if the token in the received data packet is valid. When the token is determined to be valid, the second device may accept the message and wirelessly transmit an acknowledgement back to the first device. The first device may receive the acknowledgement and in response revert back to its lower power sleep mode. When the token is determined to not be valid, the first device may remain in the higher power awake mode to listen for an updated token. The second device may wirelessly transmit an updated token to the first device at a time or during a time period when the acknowledgement would have been transmitted if the token was determined to be valid. The first device may receive the updated token, update the token of the first device and wirelessly transmit an updated data packet that includes the message and the updated token from the first device for reception by the second device.

In some cases, the token may include a first counter valve that is maintained by the first device. The first counter value may be incremented before the first device wirelessly transmits the data packet from the first device for reception by the second device. The second device may maintain a second counter value that is incremented each time a data packet is successfully communicated from the first device to the second device. The second device may determine if the token in the received data packet is valid by comparing the first counter value (i.e. token) in the first message to the second counter value. The second device may determine that the token in the received data packet is valid when the first counter value is greater than the second counter value. In some cases, the first device may be battery powered and may include a sensor, and the message may include a sensed value provided by the sensor. In some cases, the second device may be line powered (e.g. 110V, 24V, etc.).

Another illustrative method may include switching a battery powered building control device from a lower power sleep mode to a higher power awake mode. Once in the higher power awake mode, the battery powered building control device may wirelessly transmit a data packet that includes a message and a token. The token may, in some cases, include a counter value maintained by the battery powered building control device. The battery powered building control device may wait to receive a return data packet that includes either: (1) an acknowledgement; or (2) an updated token. When the return data packet includes an updated token, the method may include wirelessly transmitting an updated data packet that includes the message and the updated token, and then wait for a return data packet that includes either: (1) an acknowledgement; or (2) an updated token. This may continue until an acknowledgement is received. When the return data packet includes an acknowledgement, the method may include switching the battery powered building control device from the higher power awake mode to the lower power sleep mode.

An illustrative building control device may include a battery for powering the building control device, a sensor for providing a sensed condition, a wireless transmitter, a wireless receiver, and a controller operatively coupled to the battery, the sensor, the wireless transmitter and the wireless receiver. The controller may be configured to switch the building control device between a lower power sleep mode, in which the wireless transmitter and the wireless receiver are in a lower power state, and a higher power awake mode, in which the wireless transmitter and the wireless receiver are in a higher power operational state. The controller may also be configured to switch the building control device from the lower power sleep mode to the higher power awake mode, and then wirelessly transmit a data packet that includes a message and a token via the wireless transmitter.

Once a data packet is transmitted, the controller may be configured to wait to wireless receive via the wireless receiver a return data packet that includes either: (1) an acknowledgement; or (2) an updated token. When the return data packet includes an updated token, the controller may wirelessly transmit an updated data packet via the wireless transmitter, wherein the updated data packet may include the message and the updated token. The controller may then wireless receive via the wireless receiver a return data packet that includes either: (1) an acknowledgement; or (2) an updated token. This may continue until an acknowledgement is received. When the return data packet includes an acknowledgement, the controller may be configured to switch the building control device from the higher power awake mode back to the lower power sleep mode.

In some cases, the token may include a counter value that is maintained by the controller of the building control device and is incremented before the controller wirelessly transmits the data packet via the wireless transmitter. The updated token, when received, may include an updated counter value that is maintained by a receiving device.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various embodiments of the disclosure in connection with the accompanying drawings, in which.

DESCRIPTION

Figure 1:
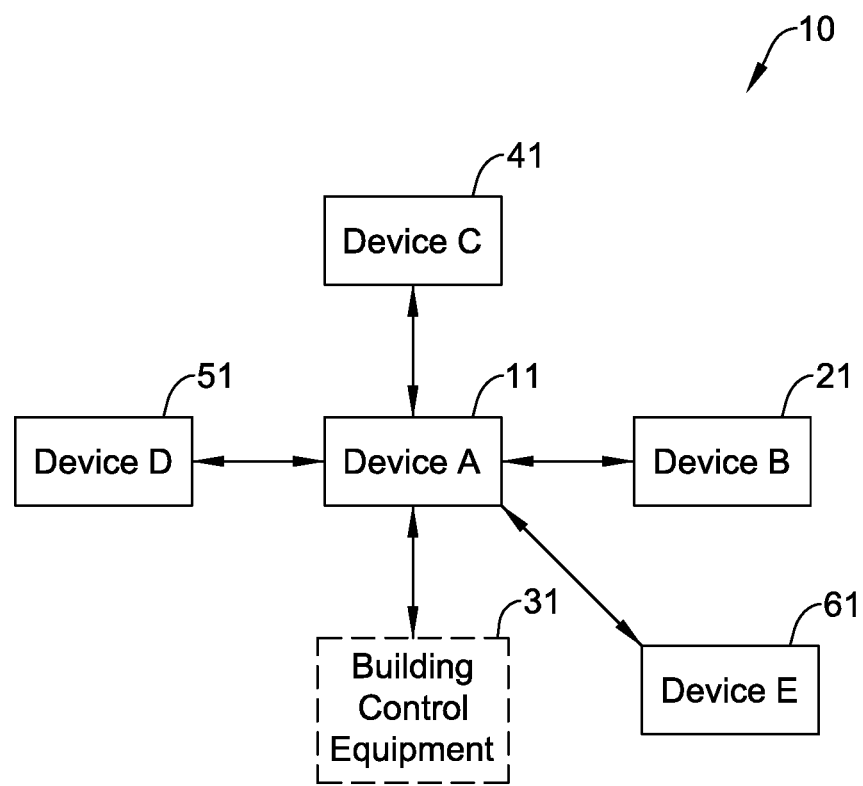
FIG. 1 is a schematic block diagram of an illustrative wireless building control system.

The following description should be read with reference to the drawings wherein like reference numerals indicate like elements throughout the several views. The description and drawings show several embodiments which are meant to be illustrative in nature.

It is contemplated that the methods and systems described herein can be applied to any suitable wireless system, especially where one or more of the devices has a lower power sleep mode and a higher power awake mode. An example is a building control system, such as an Heating Ventilation and/or Air Conditioning (HVAC) system, a security system, a lighting system, a fire detection system and/or a fire suppression system. Such systems often include one or more battery powered devices, such as battery powered sensor units, battery powered alarm units, etc. To help conserve battery energy, the battery powered devices often remain in a lower power sleep state and only listen for messages from a receiving device at some relatively large interval of time. The receiving device may be programmed to only send messages to the battery powered device at that prescribed interval and at the appropriate time. This may help reduce the wireless communication traffic in the region by only sending messages when the battery powered device is listening and can receive them.

FIG. 1 is a schematic view of an illustrative but non-limiting building control system 10. In the example shown, device A 11 is an always-on device and may be line powered (e.g. via transformer or the like), and may be configured to control building control equipment 31. The building control equipment 31 may include, for example, Heating Ventilation and/or Air Conditioning (HVAC) equipment, security equipment, lighting equipment, fire detection equipment and/or fire suppression equipment to name a few. Device A 11 may be operatively coupled to the building control equipment 31 via wired interface, a wireless interface and/or a combination wired and wireless interface.

Device A is shown to be in wireless communication with device B 21, device C 41, device D 51 and Device E 61, although these are just example devices. While four devices B-E are shown to be in wireless communication with Device A 11, it is contemplated that more or less devices may be used. It is contemplated that some of the devices B-E may be in wired communication with device A 11, rather than in wireless communication. It is also contemplated that some or all of the devices B-E may be battery powered. For example, Device B 21 may be a battery powered temperature sensor that is in wireless communication with device A 11 and may be configured to periodically wake-up, sense a temperature reading, and wirelessly communicate the sensed temperature reading to Device A 11. In some cases, another of the devices C-E may be a motion sensor, a light sensor, a smoke sensor, an alarm device, a camera, or some other sensor or device, depending on the application.

Figure 2:
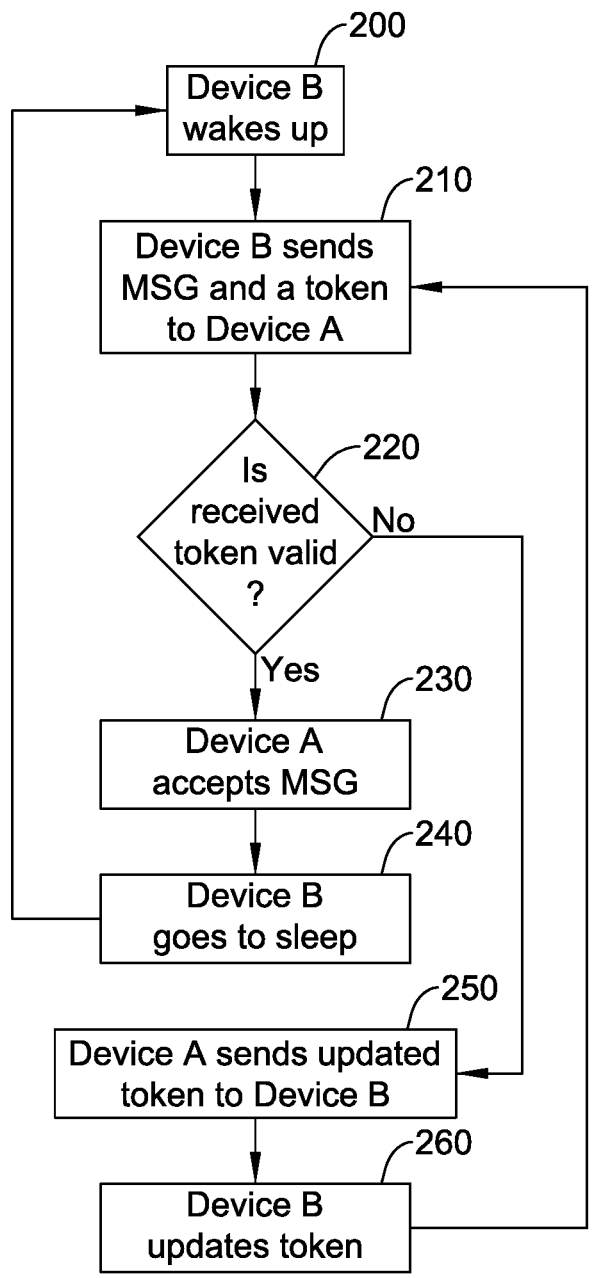
FIG. 2 is a flow diagram of an illustrative method that may be used to help foil a replay attack on the wireless building control system of FIG. 1.

FIG. 2 is a flow diagram of an illustrative method that may be used to help foil a replay attack on a wireless communication between device B 21 and device A 11 in the wireless building control system of FIG. 1. Initially, device B 21 may be in a sleep state to conserve battery power. At block 200, device B 21 wakes up from the sleep state, and wirelessly sends a data packet that includes a message and a token to device A 11. The message may include, for example, a temperature sensed by device B 21 (or other message payload) along with the address of the intended recipient of the message, in this case device A 11 but it could be another of the devices C-E or more than one of the devices (e.g. in a broadcast message).

In some cases, the token may be a value that changes with each message transmitted from the originating device B 21 to the recipient device A 11 that can be independently generated and/or verified by the recipient device A 11. For example, in some instances, the token may include a counter value that is incremented each time device B 21 sends a message to device A 11. Device A 11 may maintain a parallel counter that is incremented each time device A 11 receives a valid message from device B 21. When so provided, the parallel counter maintained by device A 11 for transmissions received from device B 21 may be used to verify the counter value sent in the message from device B 21 to device A 11.

At block 220, device A 220 determines whether the token that was included in the message from device B 21 is valid. This may be accomplished in any suitable way. In some cases, an expected token value may be independently generated by the recipient device A 11. For example, when the token includes a counter value that is incremented by device B 21 and then sends the incremented value as the token to device A 11, a parallel counter in device A 11 may independently generate an expected token value for the message. In one example, the token may be determined to be valid by device B 21 when the counter value accompanying the message is larger than the parallel counter value maintained by device A 11, since the parallel counter value may not be incremented until a message is valid and accepted by device A 11. This is just one example. In this scenario, if an eavesdropper were to capture a message from device B 21 to device A 11, and then attempt to replay the message to device A 11, device A 11 would recognize that the token is not valid because the counter value accompanying the message would not have been incremented and thus not larger than the parallel counter value maintained by device A 11.

If the token is determined to be valid, control is passed to block 230. At block 230, device A 11 accepts the message and a valid transmission has occurred. In some cases, device A 11 may then increment the parallel counter maintained by device A 11 for transmissions from device B 21 and transmit an acknowledgement to device B 21 following reception of the message and/or the token. Device B 21, having delivered a valid message to device A 11, may enter the sleep state as shown at 240 in order to conserve battery power. The device B 11 may enter the sleep state after receiving the acknowledgement. At some time later, device B 21 returns to block 200 and wakes up from the sleep state to send another message to device A 11.

If the token is determined to be invalid, control is passed to block 250. In block 250, device B 21 remains in the awake state device A 11 and transmits to device B 21 a return data packet that includes an updated token value. The updated token value may be the expected token value that is maintained by device A 11. For example, when the token includes a counter value as discussed above, the updated token value may be the counter value of the parallel counter maintained by device A 11. Once the updated token value is received by device B 21, and as shown at block 260, device B 21 may update the token in device B 21 with the updated token value. When the token includes a counter value as discussed above, the counter value maintained by device B 21 may be updated with the updated token value sent by device A 11. Control is then passed back to block 210, where device B 21 retries sending the message to device A 11, but now uses the updated token value. This transmission will likely be successful. In any event, this process may continue until device A 11 accepts the message from device B 11 at block 230 and device B reenters the sleep mode at block 240.

Figure 3:
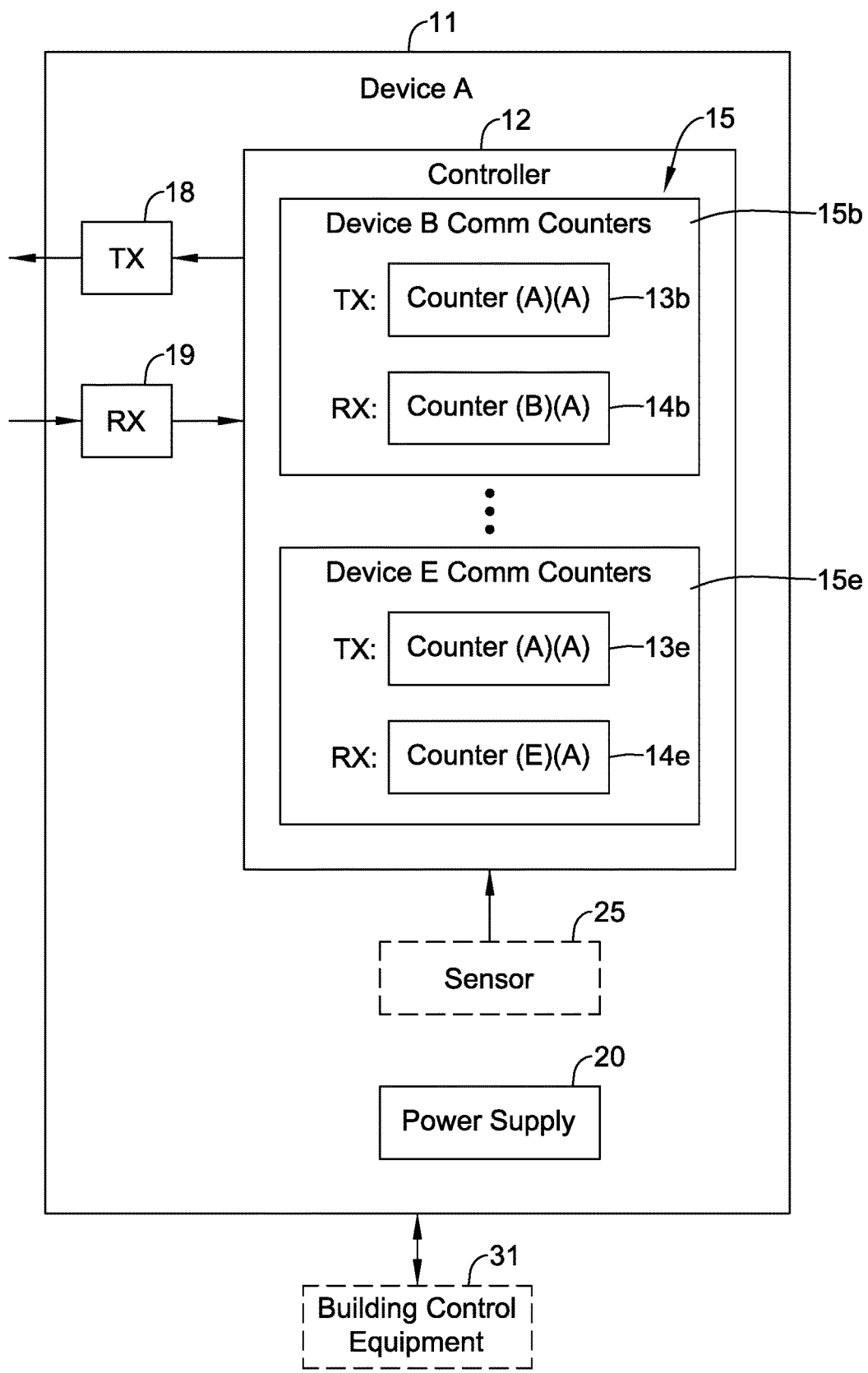
FIG. 3 is a schematic block diagram of an illustrative device A of the wireless building control system of FIG. 1.

FIG. 3 is a schematic block diagram of an illustrative device A 11 of the wireless building control system 10 of FIG. 1. In the example shown, device A 11 includes a controller 12. The controller 12 may maintain communication counters 15*b*-15*e* for each device B-E in which device A 11 can wirelessly communicate. In the example shown, the controller 12 maintains communication counters 15*b*, which include a transmit counter (A)(A) 13*b* and a receive counter (B)(A) 14*b*, for communication between device A 11 and device B 21. Likewise, the controller 12 maintains communication counters 15*e*, which include a transmit counter (A)(A) 13*e* and a receive counter (E)(A) 14*e*, for communication between device A 11 and device E 61. The other devices C-D may have similar communication counters (not shown).

The controller 12 maintains a separate transmit counter 13*b*, 13*e* for each device B-E that device A 21 will wirelessly communicate. For example, counter (A)(A) 13*b* maintains device A's 11 count of the number of messages sent from device A 21 to device B 11, and counter (B)(A) 14*b* maintains device A's 11 parallel count of the number of messages sent from device B 21 to device A 11. In the notation counter (X)(Y), the "X" represents the device that originates the communication and the "Y" represents the device that maintains the count value. For example, counter (A)(A) 13*b* hold a counter value for wireless communications that originates with device A 11 (for device B 21) and the count is maintained by device A 11. A counter (A)(B) of device B 21 may be considered a parallel counter to counter (A)(A) in device A 11. Counter (B)(A) 14*b* holds a counter value for wireless communications that originates with device B 21 and the count is maintained by device A 11. Counter (B)(A) can be considered a parallel counter to a counter (B)(B) of device B 21.

As shown in FIG. 3, device A 11 may also include a wireless transmitter 18 for wirelessly transmitting messages to one or more of the devices B-E, and a wireless receiver 19 for wirelessly receiving messages from one or more of the devices B-E. The wireless transmitter 18 and wireless receiver 19 may be configured to communicate using one or more wireless communication protocols, such as cellular communication, ZigBee, REDLINK™, Bluetooth, Wi-Fi, IrDA, infra-red (IR), dedicated short range communication (DSRC), EnOcean, and/or any other suitable common or proprietary wireless protocol, as desired.

Device A 11 may also include a power supply 20, and optionally one or more sensors 25. The power supply 20 may be any suitable power supply such as line power, a transformer supplied by line power, battery powered, line powered with battery backup, and/or any other suitable power supply configuration. The one or more sensors 25, when provided, may include any suitable sensor, including an environmental sensor (e.g. temperature, humidity, etc.), a security sensor (e.g. motion, camera, etc.), a fire sensor (smoke, flame, heat, etc.) and/or any other suitable sensor.

As shown in FIG. 3, and in some cases, device A 11 may be configured to control building control equipment 31. Device A 11 may be operatively coupled to the building control equipment 31 via wired interface, a wireless interface and/or a combination wired and wireless interface.

Figure 4:
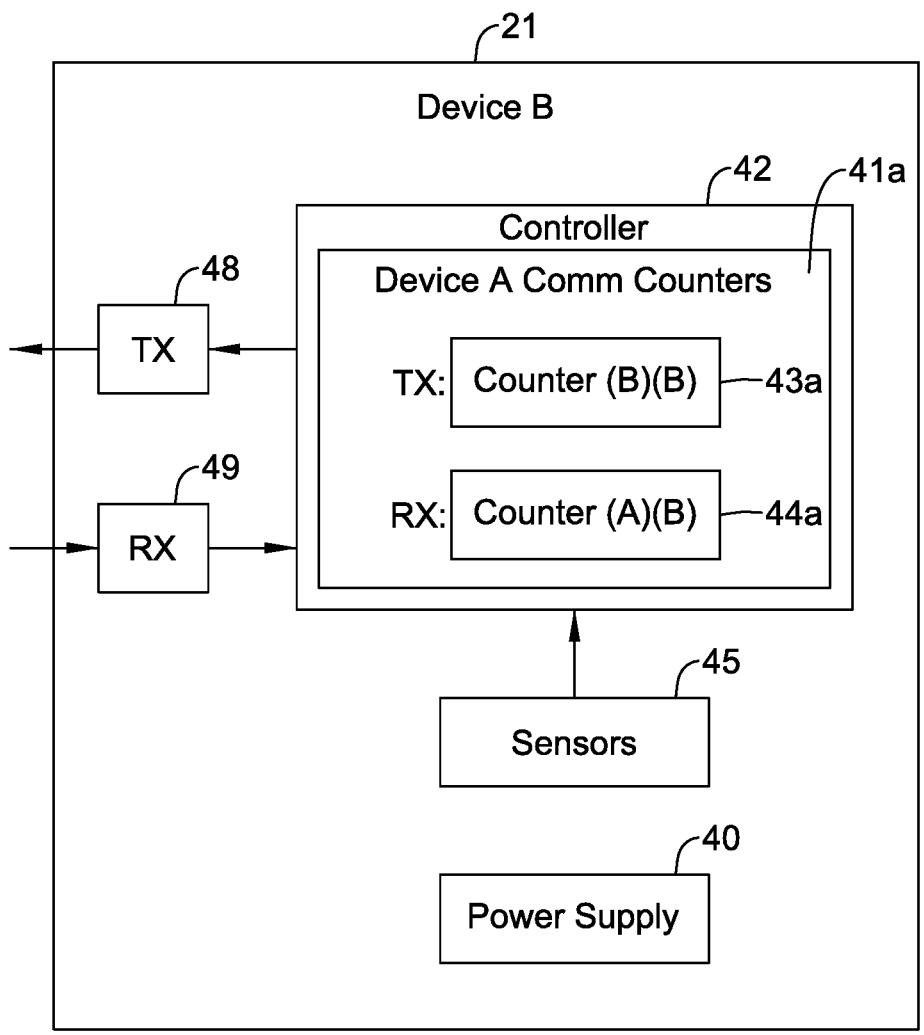
FIG. 4 is a schematic block diagram of an illustrative device B of the wireless building control system of FIG. 1.

FIG. 4 is a schematic block diagram of an illustrative device B 21 of the wireless building control system 10 of FIG. 1. In the example shown, device B 21 includes a controller 42. The controller 42 may maintain communication counters 41*a* for communication with device A 11. In this example, device B 21 only wirelessly communicates with device A 11, and thus only one set of communication counters is needed. If device B 21 were also to communicate with one or more other devices (e.g. device C and/or E), the controller 42 would maintain a set of communication counters for each of these other devices.

The illustrative set of communication counters 41*a* of device B 21 include a transmit counter (B)(B) 43*a* and a receive counter (A)(B) 44*a*, both for managing communication between device B 21 and device A 11. Transmit counter (B)(B) 43*a* holds a counter value for wireless communications that originate with device B 21 (for communication to device A 11) and the count is maintained by device B 21. Counter (B)(A) 14*b* of device A 11 (see FIG. 3) may be considered a parallel counter to counter (B)(B) 43*a* in device B 21. Counter (A)(B) 44*a* of device B 21 holds a counter value for wireless communications that originate with device A 11 and the count is maintained by device B 21. Counter (A)(B) 44*a* can be considered a parallel counter to a counter (A)(A) 13*e* of device A 11 (see FIG. 3).

As shown in FIG. 4, device B 21 may also include a wireless transmitter 48 for wirelessly transmitting messages to device A 11, and a wireless receiver 49 for wirelessly receiving messages from device A 11. The wireless transmitter 48 and wireless receiver 49 may be configured to communicate using one or more wireless communication protocols, such as cellular communication, ZigBee, REDLINK™, Bluetooth, Wi-Fi, IrDA, infra-red (IR), dedicated short range communication (DSRC), EnOcean, and/or any other suitable common or proprietary wireless protocol, as desired.

Device B 21 may also include a power supply 40, and optionally one or more sensors 45. The power supply 20 may be any suitable power supply, but in some embodiments, the power supply may include one or more batteries and device B 21 may be considered a battery powered device. In some cases, the battery may be or may include a battery, a super-capacitor and/or any other suitable energy storage device. In some cases, the one or more batteries may be rechargeable or non-rechargeable. In some cases, the power supply may be line powered with battery backup. The one or more sensors 45, when provided, may include any suitable sensor, including an environmental sensor (e.g. temperature, humidity, etc.), a security sensor (e.g. motion, camera, etc.), a fire sensor (smoke, flame, heat, etc.) and/or any other suitable sensor as desired.

It is contemplated that the controller 42 may be configured to place device B 21 in a sleep state from a wake state. The controller 42 may wake up device B 21 from the sleep state from time to time and transmit a message to device A 11, listen for an acknowledgement and/or an updated token, before returning to the sleep state. In some cases, device B 21 may remain in the sleep state a majority of the time. Remaining in the sleep state for a majority of the time may help reduce power consumption from the battery and extend the battery life of device B 21.

In some instances, the controller 42 may be configured to switch device B 21 between the lower power sleep mode and the higher power awake mode. In the lower power sleep mode, device B 21 may not send or receive messages to/from device A 11 (or another device C-E). In some instances, the sensor 45 may provide a sensor signal that encodes a measure related to the sensed condition in or around the wireless sensor device. The sensor 45 may be used to sense one or more conditions in or around device B 21. In some instances, the sensor 45 produces a signal that is used to determine when to switch device B 21 between the lower power sleep mode and the higher power awake mode (e.g. when a predetermined temperature is reached, when a predetermined temperature change is detected, etc.). In other cases, controller 42 may switch device B 21 between the lower power sleep mode and the higher power awake mode in accordance with a time schedule. The time schedule may be communicated to device A 11, or the time schedule may be communicated from device A 11 to device B 21, so that device A 11 knows when to expect a message from device B 21 and/or knows when to send a message to device B 21. In some cases, when device B 21 is in the lower power sleep mode, no successful communication to/from device B 21 may be expected.

Figure 5:
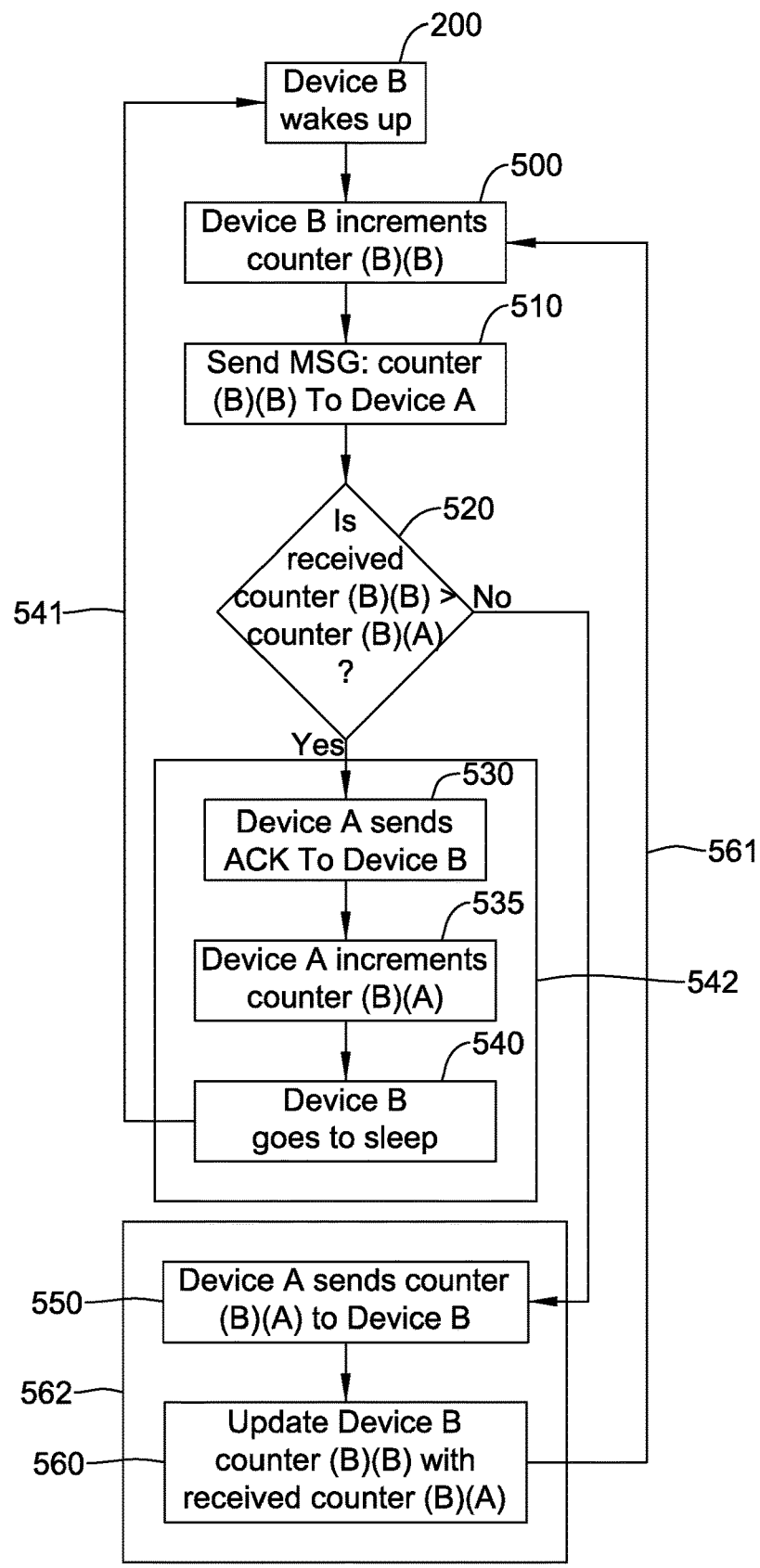
FIG. 5 is a flow diagram of an illustrative transmission between the illustrative device B of FIG. 3 and the illustrative device A of FIG. 4.

FIG. 5 is a flow diagram of an illustrative transmission between the illustrative device B 21 of FIG. 3 and the illustrative device A 11 of FIG. 4. Initially, device B 21 may be in a sleep state. At block 200, device B 21 wakes up from the sleep state and increments counter B (B) 43 at block 500. In the case that device B 21 is battery-powered, the receiver may remain on to receive a wake up message from device A 11, if desired. The incremented counter value may be stored at counter (B)(B) 43*a* and maintained in device B 21. Next, device B 21 may transmit a message (e.g. sensor value, alarm or other message) along with the increment counter value (B)(B) 43*a* to device A 11 at block 510. An error detecting or correcting integrity code may be included as well (e.g. parity or other ECC code). In some cases, the message and/or incremented counter value (B)(B) 43*a* may be encrypted before transmission. The transmission may occur upon an event (e.g. an action or occurrence to which the system may respond) or may occur periodically. Next, device B 21 listens for either an acknowledgement or an updated token from device A 11.

At block 520, device A 11 may receive the transmitted message and incremented counter value (B)(B) 43*a* from device B 21. The received counter value (B)(B) 43*a* is compared to the counter value (B)(A) 14*b* maintained by device A 11. As indicated above, counter (B)(A) 14*b* maintains device A's 11 parallel count of the number of messages sent from device B 21 to device A 11. If the received counter value (B)(B) 43*a* is greater than the counter value (B)(A) 14*b* maintained by device A 11, then device A 11 notifies device B 21 that the message was received, as shown by block 542. For example, at block 530, device A 11 may send an acknowledgment message back to device B 21. At block 535, device A 11 may increment its counter value (B)(A) to prepare for the next transmission from Device B 21. Device B 21 may then go back to sleep as shown at 540, and control may be passed back to block 200.

Referring back to block 520, if the received counter value (B)(B) 43*a* is not greater than the counter value (B)(A) 14*b* maintained by device A 11, then there is a miss-match between the counter value (B)(B) 43*a* maintained by device B 21 for tracking communications from device B 21 to device A 11, and the parallel counter (B)(A) 14b maintained by device A 11. When this occurs, device A 11 updates the corresponding counter value in device B 21, as shown at block 562. In the example shown, device A 11 may send the parallel counter (B)(A) 14b maintained by device A 11 to device B 21 as shown at block 550. Device A 11 may send the updated token to device B 21 at a time or during a time period that device A 11 would otherwise have sent the acknowledgement if the token was determined to be valid. At block 560, device B 21 may update counter (B)(B) 43a with the received counter value (B)(A). Control may then be passed back to block 500 to retry the transmission with the updated counter value (B)(B) 43a.

Figure 6:
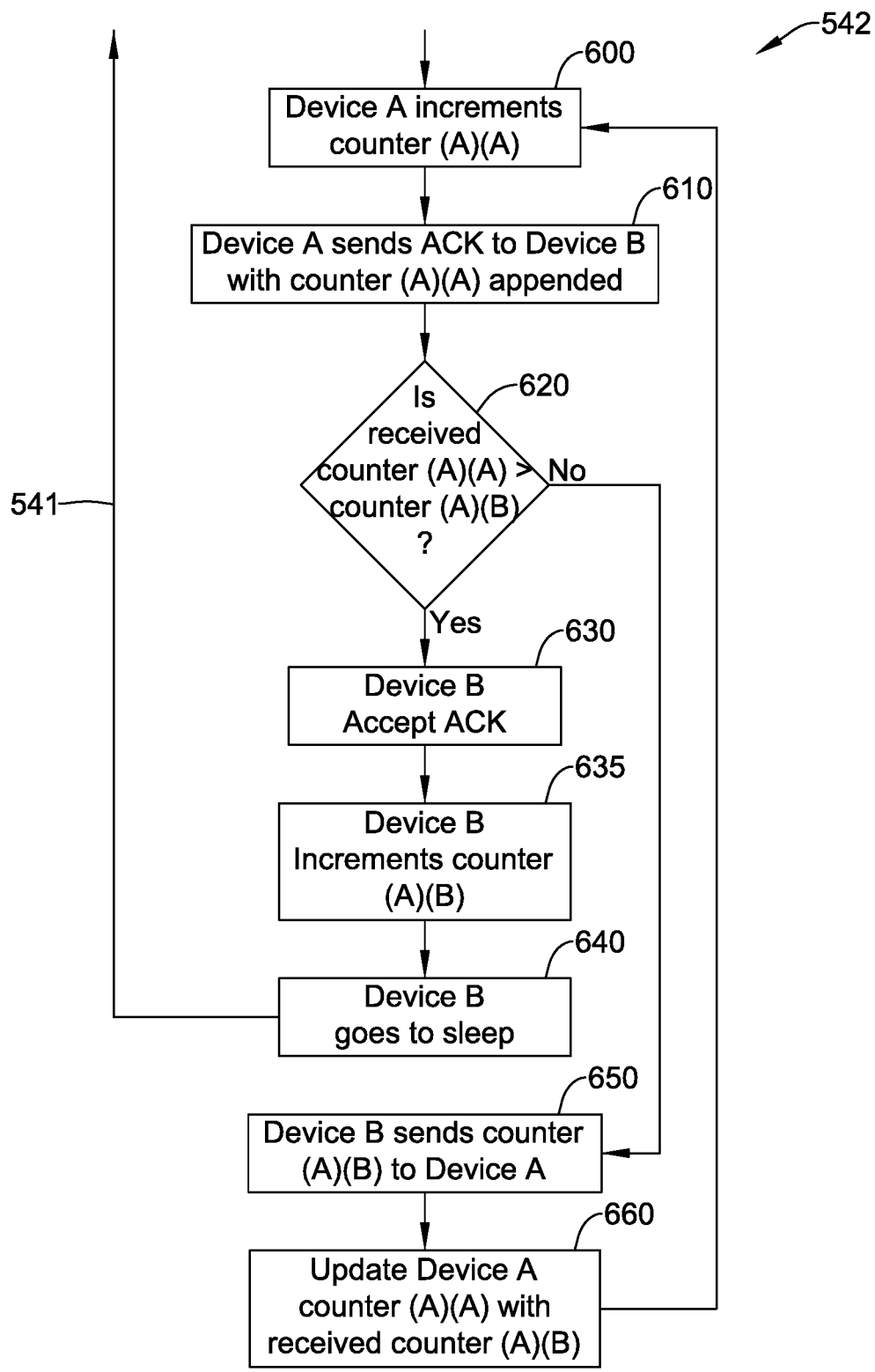
FIG. 6 is a flow diagram of an alternative approach for sending the acknowledgement from device A to device B in FIG. 5.

FIG. 6 is a flow diagram of an alternative approach for sending the acknowledgement from device A 11 to device B 21 as shown at block 542 of FIG. 5. It is contemplated that FIG. 6 may replace blocks 530, 535 and 540 of FIG. 5. As noted with respect to FIG. 5, if the received counter value (B)(B) 43a is greater than the counter value (B)(A) 14b maintained by device A 11, then device A 11 notifies device B 21 that the message was received with an acknowledgement message. In doing so, device A 11 may increment counter (A)(A) 13b of device A 11, as shown at block 600. As noted with respect to FIG. 3, counter (A)(A) 13b maintains device A's 11 count of the number of messages sent from device A 21 to device B 11. Device A 11 then sends the acknowledgement (ACK) message to device B 21 along with now incremented counter value (A)(A) 13b, as shown at block 610. Device B 21 then compares the received counter (A)(A) 13b with counter (A)(B) 44a maintained by device B 21, as shown at block 620. As noted above, counter (A)(B) 44a of device B 21 holds a counter value for wireless communications that originate with device A 11 and the count is maintained by device B 21, and counter (A)(B) 44a can be considered a parallel counter to a counter (A)(A) 13b of device A 11. If the received counter value (A)(A) 13b is greater than the counter value (A)(B) 44a maintained by device B 21, then device B 21 accepts the acknowledgment message as shown at block 630, increments its counter (A)(B) 44a as shown at 635, and then goes to sleep as shown at block 640. Control is then passed back to block 200 of FIG. 5.

Referring back to block 620, if the received counter value (A)(A) 13b is not greater than the counter value (A)(B) 44a maintained by device B 21, then there is a miss-match between the counter value (A)(A) 13b maintained by device A 11 for tracking communications from device A 11 to device B 21, and the parallel counter (A)(B) 44a maintained by device B 21. When this occurs, device B 21 updates the corresponding counter value in device A 11. In the example shown, device B 21 may send the parallel counter (A)(B) 44a maintained by device B 21 to device A 11, as shown at block 650. At block 660, device A 11 may updated counter (A)(A) 13b with the received counter value (A)(B) 44a. Control may then be passed back to block 600 to retry the transmission of the ACK message with the updated counter value (A)(A) 13b.

Figure 7:
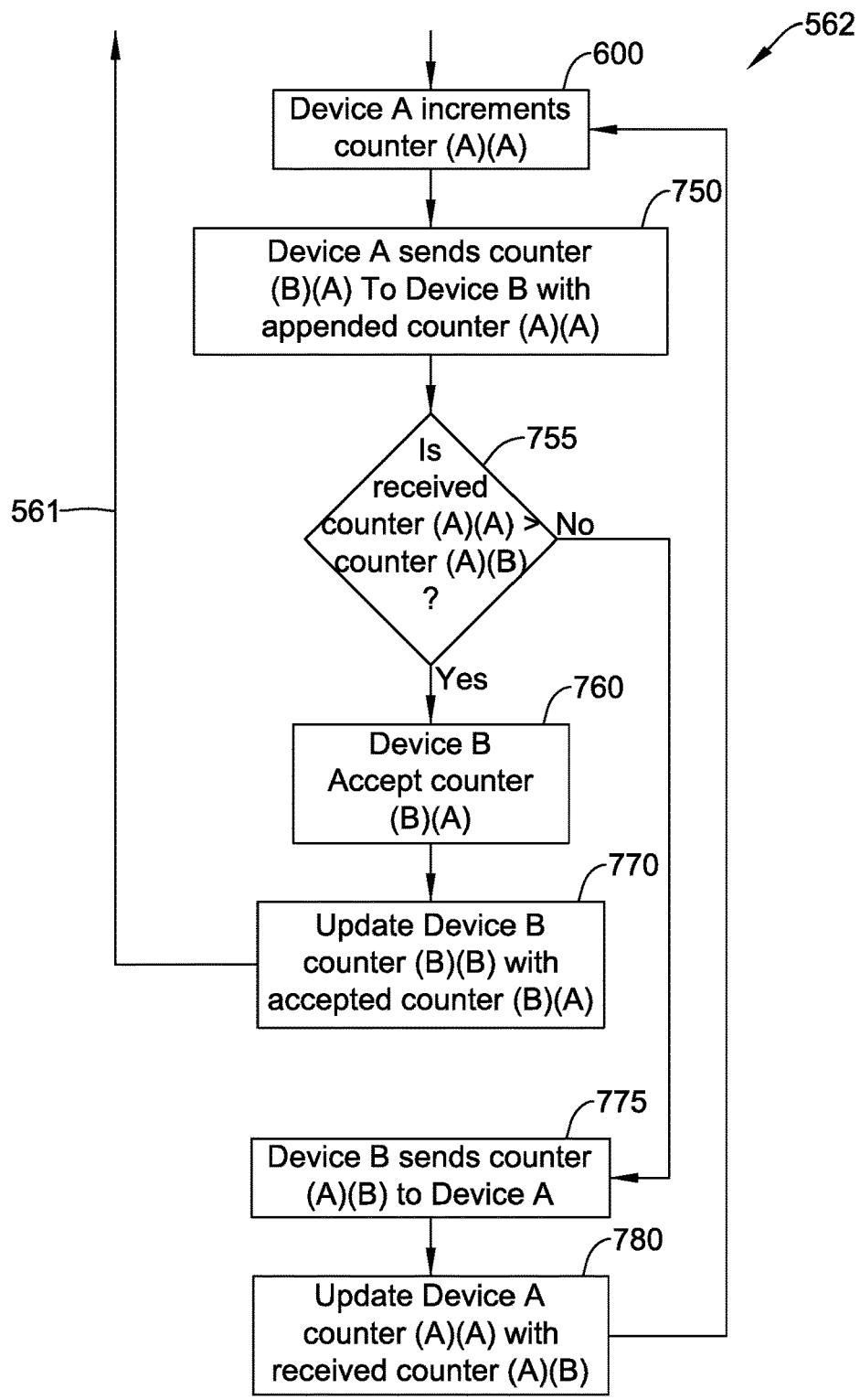
FIG. 7 is a flow diagram of an alternative approach for sending an updated counter value from device A to device B in FIG. 5.

FIG. 7 is a flow diagram of an alternative approach for sending an updated counter value from device A 11 to device B 21 in FIG. 5. It is contemplated that FIG. 7 may replace blocks 550 and 560 of FIG. 5. Referring back to block 520 of FIG. 5, if the received counter value (B)(B) 43a is not greater than the counter value (B)(A) 14b maintained by device A 11, then there is a miss-match between the counter value (B)(B) 43a maintained by device B 21 for tracking communications from device B 21 to device A 11, and the parallel counter (B)(A) 14b maintained by device A 11. When this occurs, device A 11 updates the corresponding counter value in device B 21 by sending an updated counter value to device B 21. In doing so, device A 11 may increment counter (A)(A) 13b of device A 11, as shown at block 600. Device A 11 then sends counter (B)(A) 14b to device B 21 with counter (A)(A) 13b appended, as shown at block 750. If the receive counter value of counter (A)(A) 13b is greater than the value at counter (A)(B) 44a of device B 21, then the counter value of counter (B)(A) 14b is accepted by device B 21 as shown at block 760. Counter (B)(B) 43a of device B 21 is then updated with the accepted value at counter (B)(A) 14b as shown at block 770, and control is passed back to block 500 of FIG. 5.

Alternately, if the received counter value (A)(A) 13b at device B 21 is not greater than the value of counter (A)(B) 44a of device B 21, device B 21 sends the value of counter (A)(B) 44 of device B 21 to device A 11, as shown at block 775. After which, the value of counter (A)(A) 13 of device A 11 is updated with the received value of counter (A)(B) 44 from device B 21, as shown at block 780. Control is then passed back to block 600 of FIG. 7.

Having thus described the preferred embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure.

What is claimed is:

1. A method for wireless transmission between a first device and a second device, wherein the first device has a lower power sleep mode and a higher power awake mode, the method comprising:
    awaking the first device from the lower power sleep mode;
    wirelessly transmitting a data packet from the first device for reception by the second device, wherein the data packet includes a message and a token;
    listening by the first device for either an acknowledgement or an updated token from the second device;
    receiving the data packet at the second device;
    determining if the token in the data packet received at the second device is valid;
    in response to the second device determining that the token in the data packet received by the second device is not valid:
        wirelessly transmitting an updated token from the second device to the first device at a time or during a time period when the acknowledgement would have been transmitted had the token been determined to be valid,
        receiving the updated token at the first device,
        updating the token of the first device, and
        wirelessly transmitting an updated data packet from the first device for reception by the second device, wherein the updated data packet includes the message previously transmitted by the first device to the second device and the updated token;
    receiving the updated data packet at the second device;
    determining if the updated token in the updated data packet received at the second device is valid; and
    in response to the second device determining that the updated token in the data packet received by the second device is valid:

accepting the message at the second device,
wirelessly transmitting an acknowledgement by the second device for reception by the first device,
receiving the acknowledgement at the first device, and
changing the first device to the lower power sleep mode.

2. The method of claim 1, wherein the token includes a first counter value.

3. The method of claim 2, wherein the first counter value is maintained by the first device.

4. The method of claim 3, wherein the first counter value is incremented before the first device wirelessly transmits the data packet from the first device for reception by the second device.

5. The method of claim 3, wherein the second device maintains a second counter value that is incremented each time a data packet is successfully communicated from the first device to the second device.

6. The method of claim 5, wherein the second device determines if the token in the received data packet is valid by comparing the first counter value to the second counter value.

7. The method of claim 6, wherein the second device determines that the token in the received data packet is valid when the first counter value is greater than the second counter value.

8. The method of claim 1, wherein the first device includes a sensor, and the message includes a sensed value provided by the sensor.

9. The method of claim 1, wherein the first device is battery powered, and the second device is line powered.

10. A building control device comprising:
a power source for powering the building control device;
a sensor for providing a sensed condition;
a wireless transmitter;
a wireless receiver;
a controller operatively coupled to the power source, the sensor, the wireless transmitter and the wireless receiver, the controller configured to:
switch the building control device between a lower power sleep mode, in which the wireless transmitter and the wireless receiver are in a lower power state, and a higher power awake mode, in which the wireless transmitter and the wireless receiver are in a higher power operational state
switch the building control device from the lower power sleep mode to the higher power awake mode;
wirelessly transmit a data packet via the wireless transmitter, wherein the data packet includes a message and a token;
wirelessly receive, via the wireless receiver, a return data packet that includes either: (1) an acknowledgement or (2) an updated token before returning to the lower power sleep mode;
in response to receiving, at a time or during a time period when the acknowledgement would have been received had the token been determined to be valid, the return data packet that includes the updated token that is generated in response to the token sent by the controller being determined not to be valid:
update the token of the building control device;
wirelessly transmit an updated data packet via the wireless transmitter, wherein the updated data packet includes the message previously transmitted by the controller and the updated token, and
wireless receive, via the wireless receiver, an updated return data packet that includes either: (1) the acknowledgement; or (2) a further updated token; and
in response to receiving the updated return data packet that includes the acknowledgement, switch the building control device from the higher power awake mode to the lower power sleep mode.

11. The building control device of claim 10, wherein the token includes a counter value.

12. The building control device of claim 11, wherein the counter value is maintained by the controller and is incremented before the controller wirelessly transmits the data packet via the wireless transmitter.

13. The building control device of claim 12, wherein the updated token includes an updated counter value.

14. The building control device of claim 10, wherein the sensor is one of a temperature sensor, a humidity sensor, a smoke sensor, a $CO_2$ sensor, a motion sensor, a glass break sensor, and a light sensor.

15. The building control device of claim 10, wherein the power source includes a battery.

16. The building control device of claim 10, wherein the power source only includes a battery or a capacitor.

17. A method for communicating from a battery powered building control device, the method comprising:
switching the battery powered building control device from a lower power sleep mode to a higher power awake mode;
wirelessly transmitting a data packet that includes a message and a token;
listening for either an acknowledgement or an updated token;
wirelessly receiving during an expected time period following the wireless transmitting step, a return data packet that includes either: (1) the acknowledgement; or (2) the updated token;
in response to receiving, at a time or during a time period when the acknowledgement would have been received had the token been determined to be valid, the return data packet that includes the updated token that is generated in response to the token sent by the controller being determined not to be valid:
updating the token of the battery powered building control device,
wirelessly transmitting an updated data packet that includes the updated token, and
wireless receiving an updated return data packet that includes either: (1) the acknowledgement; or (2) a further updated token; and
in response to receiving the updated return data packet that includes the acknowledgement, switching the battery powered control device from the higher power awake mode to the lower power sleep mode.

18. The method of claim 17, wherein the token includes a counter value.

19. The method of claim 18, wherein the counter value is maintained by the battery powered building control device and is incremented before wirelessly transmitting the data packet.

20. The method of claim 17, wherein the battery powered building control device includes a sensor, and the message includes a sensed value provided by the sensor.

* * * * *